Nov. 27, 1962 R. M. HORNING ETAL 3,066,010
PURIFICATION OF METAL CHLORIDES
Filed April 13, 1959 3 Sheets-Sheet 2
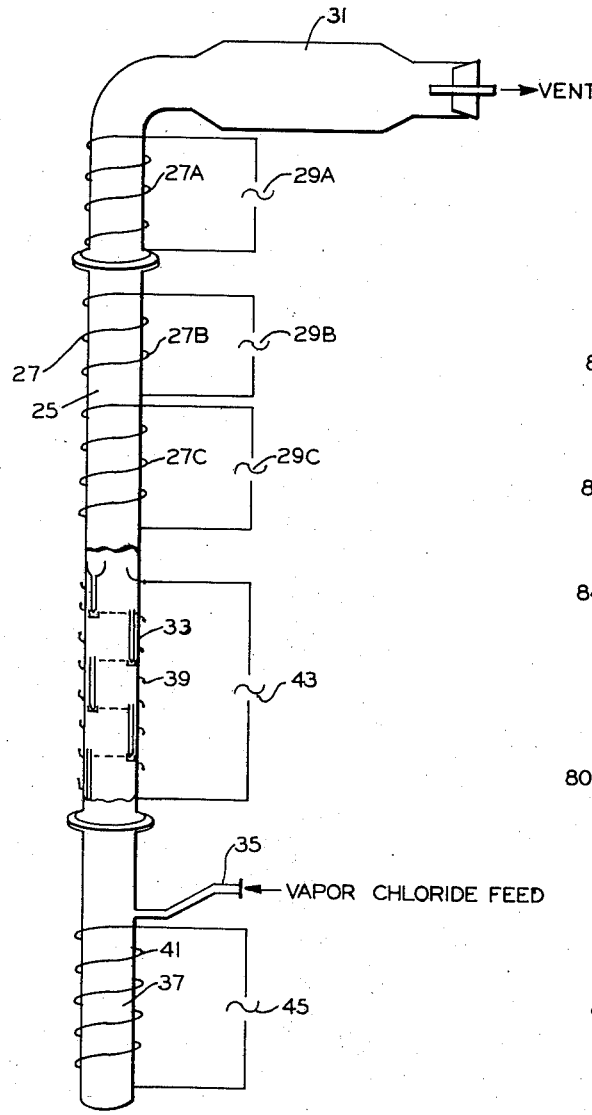
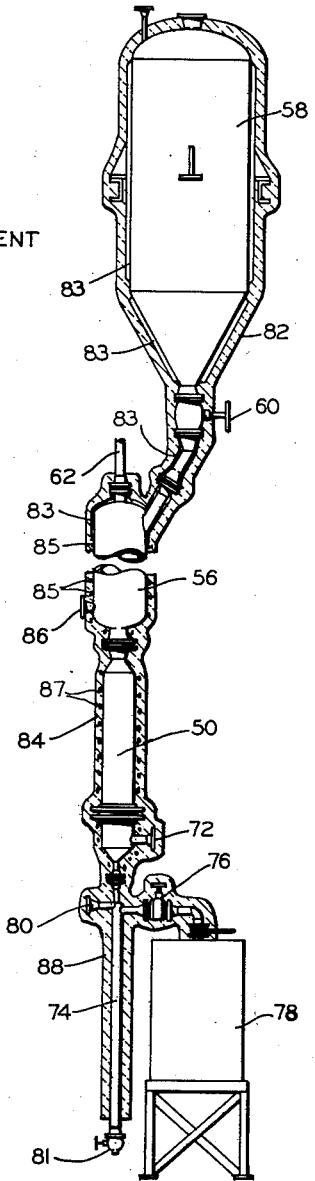
INVENTORS
ROBERT M. HORNING
ALEXIS I. KAZNOFF
JOHN F. HEIL
ECKHOFF & SLICK
ATTORNEYS
BY
A MEMBER OF THE FIRM

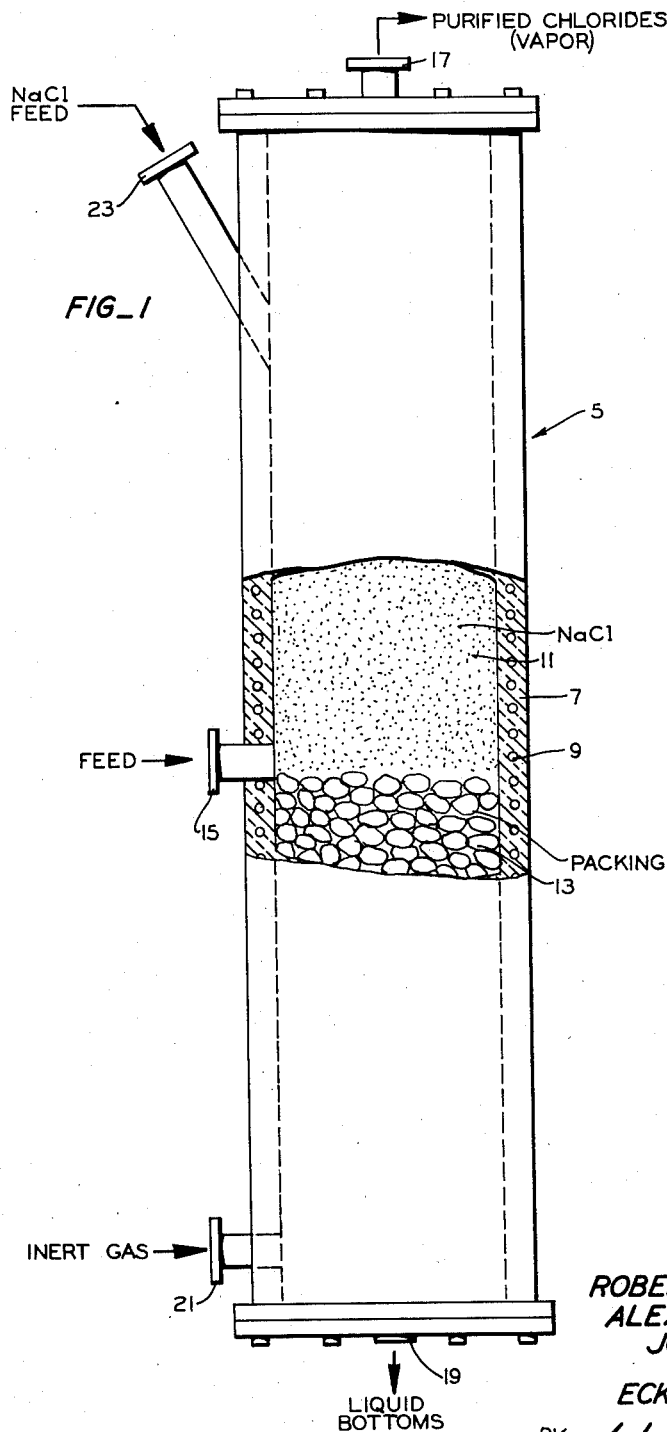

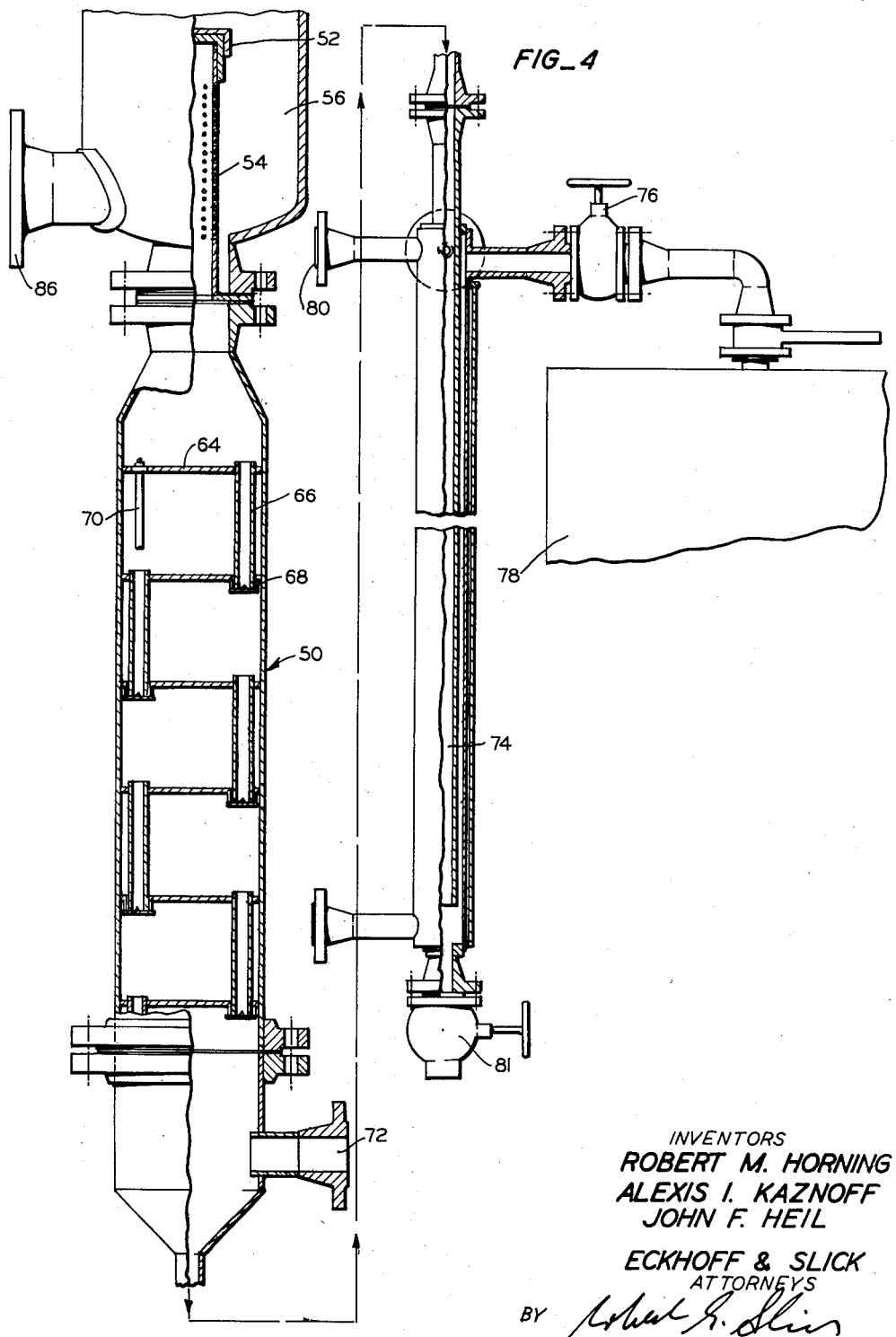

United States Patent Office 3,066,010
Patented Nov. 27, 1962

3,066,010
PURIFICATION OF METAL CHLORIDES
Robert M. Horning, Albany, and Alexis I. Kaznoff and John F. Heil, San Francisco, Calif., assignors to Stauffer Chemical Company, a corporation of Delaware
Filed Apr. 13, 1959, Ser. No. 805,827
2 Claims. (Cl. 23—87)

This invention relates to a method of purifying a mixture of tantalum pentachloride, niobium pentachloride, tungsten hexachloride, or tungsten oxytetrachloride, either alone or in various mixtures, which contains ferric chloride and/or aluminum trichloride as contaminants. The invention is particularly applicable to purifying mixtures which contain both niobium and tantalum pentachloride.

Extensive efforts have been made to purify the chlorides and oxychlorides $TaCl_5$, $NbCl_5$, $WCl_6$ and $WOCl_4$ so that they could be used as catalysts and catalyst intermediates and as metal intermediates. Impure mixtures of these chlorides have physical properties which heretofore have made their separation a difficult problem. The vapor phase hydrogen reduction of $FeCl_3$ has been suggested as a purification method. This is an unsuitable method for some of these chlorides because the tungsten chloride and oxychloride and niobium pentachloride are also reduced to a greater or lesser extent and $AlCl_3$ is not reduced. The atmospheric distillation of these impure chlorides and oxychlorides has been suggested as a method of purification. Because of the tendency of $FeCl_3$ to decompose, a continuous distillation apparatus is extremely difficult to operate. A bath distillation is easier to operate; however the equipment size and through-put make this uneconomic. A batch distillation using the addition of NaCl to the bottoms is an improvement because certain azeotropes which might occur are broken; however the uneconomic aspects remain.

One object of this invention is to provide a process for the separation of aluminum chloride and ferric chloride from the desired chlorides and oxychlorides, tantalum pentachloride, niobium pentachloride, tungsten hexachloride and tungsten monoxytetrachloride. Another object is to provide a process whereby this separation can be accomplished and the losses of the desired chlorides and oxychlorides minimized. Another object is to provide a process whereby this separation can be accomplished in a semi-continuous or continuous manner.

In one modification of this process, all the above objects can be accomplished and at the same time the corrosive attack on metallic materials of construction also minimized. This modification gives an economic advantage because otherwise metal would have to be lined, in the corrosion zone, with a ceramic.

In accordance with the present invention, a mixture of such impure chlorides may be freed of the contaminating ferric and aluminum chlorides by passing the impure mixture of chlorides and oxychlorides in vapor phase through a column which contains solid sodium chloride maintained at a temperature about 250° C. to 450° C. The aluminum and ferric chlorides form a melt with the sodium chloride and can be removed from the column as a liquid melt while the desired chlorides remain in vapor phase and pass through solid sodium chloride, which reacts with traces of aluminum and ferric chloride of amount too small to form a melt, and are taken overhead from the column for further processing. This accomplishes the first object.

In accordance with the present invention, the losses of desired chloride or oxychloride are minimized by any one or a combination of several of the following methods:

The partial pressures of the desired chlorides or oxychlorides may be lowered, for example, by the presence of gases or vapors such as nitrogen, chlorine, carbon monoxide, carbon dioxide, titanium tetrachloride, silicon tetrachloride, tin tetrachloride, or other gases and vapors. There are other methods of lowering the partial pressure.

The temperature may be raised. This increases the liquid melt temperature and decreases the losses of desired chlorides and oxychlorides.

The melt may be stripped by a gas stream containing a low partial pressure of the desired chlorides or oxychlorides.

The melt may be stripped by the input vapor stream. In this case, since no solid sodium chloride is present the melt absorbs ferric and aluminum chlorides from the vapor stream, changes its composition which further accomplishes the object of minimizing desired chloride or oxychloride losses.

The losses of tantalum pentachloride or niobium pentachloride can be minimized by having the other present in the feed stream. At a given partial pressure for the one pentachloride and for a given temperature and operating conditions the presence of the other pentachloride decreases the losses of the first.

These methods are used to accomplish the second object.

In accordance with the present invention, the separation is accomplished in a semi-continuous or continuous manner by feeding ordinary commercial kiln dried salt (purity 99.7% NaCl) sized to give a fairly large surface area but not so finely divided that it impedes the free flow of gases upward through the column in either a continuous or batchwise manner so that unreacted salt always remains within the reactor. A typical screen analysis for the salt would be:

| | Percent passing |
|---|---|
| 8 mesh | 20 |
| 6 mesh | 61 |
| 4 mesh | 96 |
| 3 mesh | 100 |

Then into this reactor system would pass the vapor feed stream and from the reactor system would come the purified product vapors. The liquid melt containing impurities could be batch removed or continuously removed through a heated liquid pressure seal-leg. When the melt is not saturated with respect to NaCl, then the liquidus temperature is lower than the liquid seal-leg is easier to operate without pluggage.

In the drawings forming part of this application:
FIGURE 1 shows a column, partly in section, suitable for performing the present invention.
FIGURE 2 shows an improved form of apparatus for carrying out the invention.
FIGURE 3 illustrates a practical plant-scale device for carrying out the invention.
FIGURE 4 is an enlarged detail drawing, partly in section of a portion of FIGURE 3.

Referring to the drawings by reference characters, and particularly FIGURE 1, there is shown a column, generally designated 5 with an insulating covering 7 in which is imbedded a resistance element 9 for supplying heat. The upper portion of the column is filled with coarse salt 11 while the bottom of the column is filled with a packing material 13, such as glass Raschig rings. The material to be purified is introduced as a vapor at 15 which is at the bottom of the salt. The purified vapors are taken off at 17 while the liquid bottoms are taken off at 19. An inert gas (argon) bleed is introduced at 21. If desired, fresh salt can be added at 23.

Referring now to FIGURE 2, there is shown in this embodiment a column 25 provided with a wrapping of resistance wire so that the column can be heated. The resistance wire is broken into several segments, 27A, 27B and 27C, each of which is supplied with a separate source of electricity, 29A, B and C, so that different parts of the column can be maintained at different temperatures. Above the column an air cooled section 31 is provided to received the purified material. Below the column, a 4 plate sieve column 33 with submerged downcomers is provided as a stripper-absorber. The vapor feed enters at 35 and below the entrance 35 a receiver 37 is provided. Both the sieve column 33 and the receiver 37 are provided with heating elements 39 and 41 supplied with electricity from sources 43 and 45 so that they can be heated to any desired degree.

FIGURES 3 and 4 describe another apparatus in which the process of this invention may be practiced. It is a continuous reactor using batch charging of solid NaCl. The vapors from the sieve plate column 50 pass both under cap 52 and through the holes in 54 into the bed of solid NaCl 56. The liquid melt formed by the interaction of vaporous $Fe_2Cl_6$ and $Al_2Cl_6$ with solid NaCl drains down the bed of NaCl and passes through the holes in 54 into the sieve plate column 50. The product vapors rise through the solid NaCl 56 and the traces of $Al_2Cl_6$ and $Fe_2Cl_6$ react with the surface of the NaCl. Fresh hot NaCl is charged from time to time from a storage heating tank 58 through a valve 60. Thus, the result is a countercurrent vapor-solid reactor of the moving bed type where the reaction in itself disposes of the contaminated NaCl solid. The purified product vapors pass off through a pipe 62.

The liquid which flows down through the perforated pipe 54 flows onto a perforated sieve tray 64, across the tray and over a weir and into the downcomer 66. The lower end of the downcomer is liquid sealed in a seal pot 68. This is useful during startup because of the low liquid flow rate. If the downcomers are not sealed, poor vapor liquid contacting may continue. The sieve trays are supported on three supports 70. The incoming process stream enters the bottom of the sieve tray column through a pipe 72. The melt containing NaCl, $FeCl_3$, $AlCl_3$ passes through a pressure seal leg 74 through a valve 76 to a barrel 78. A dry nitrogen gas purge enters at the outlet 80 of the seal leg and passes off through the atmospheric vent, not shown, from the barrel 78. A sampling valve 81 is located at the bottom of leg 74.

The various parts of the apparatus are heated and insulated in separately controlled zones. The salt storage tank 58 and the upper portion of the NaCl bed is insulated, 82, and jacketed, 83, and heated with condensing vapor. The bottom of the NaCl bed where the majority of the reaction occurs is heated electrically, 85, and insulated. Surface thermocouples, not shown, and a thermowell thermocouple, not shown, in a flange 86 are used to control the electric power and indicate temperatures. The seal-leg 74 is jacketed and line to barrel 78 is traced with a flexible hose. These carry a hot pumped liquid and are insulated 88.

The following non-limiting examples illustrated preferred methods of practicing the invention:

*Example I*

The equipment used in carrying out this example is illustrated in FIGURE 1.

About 61.1 grams of anhydrous mixed metal chloride vapor was fed to the salt column described which contained 100 grams of solid NaCl. The temperature of the salt bed was maintained at 293±10° C. A bottoms receiver was provided which was held at 341° C. A purge of argon entered below the salt bed at 21.

The bottom stream was a fluid melt which solidified on cooling. The vapors passing through the NaCl bed were taken off at 17 and cooled to room temperature; an anhydrous solid was formed and the gases and noncondensable vapors passed on through a condenser.

The condensed chloride feed analyzed:

| | Wt. percent |
|---|---|
| Cl⁻ | 62.0 |
| Nb | 19.4 |
| Ta | 7.3 |
| Fe | 9.2 |
| Mn | 0.6 |
| Al | 0.1 |
| Ti | 0.1 |

With traces of Cr, W and C.

The bottom stream analysed:

| | Wt. percent |
|---|---|
| Cl⁻ | 64.0 |
| Fe | 22.8 |
| Na | 11.0 |
| Ta | 1.7 |
| Nb | 1.2 |
| Al | 0.2 |

The overhead solid product analysed:

| | Wt. percent |
|---|---|
| Cl⁻ | 62.0 |
| Nb | 27.8 |
| Ta | 9.8 |
| Fe | 0.002 |

From the weights of the various products it is found that 2% of the niobium and 8% of the tantalum in the feed is lost as bottoms.

*Example II*

The equipment shown as FIGURE 1 was modified by filling the entire column with salt, blocking off the opening 15 and introducing both the metal chloride vapors and the inert gas at 21.

About 54.2 grams of anhydrous mixed metal chloride vapor was fed to the salt column containing 100 grams of solid NaCl. The temperature of the salt bed was maintained at 354±15° C. and the bottom receiver held at 395° C. A purge of inert gas entered below the salt bed.

The condensed chloride feed analysed:

| | Wt. percent |
|---|---|
| Cl⁻ | 63.0 |
| Nb | 17.9 |
| Ta | 6.8 |
| Fe | 8.45 |
| W | 1.9 |
| Al | 1.1 |

The tungsten was largely in the form of $WCl_6$.

The bottom stream analysed:

| | Wt. percent |
|---|---|
| Cl⁻ | 65.6 |
| Fe | 19.2 |
| Na | 9.5 |
| Al | 3.4 |
| Ta | 0.15 |
| Nb | 0.13 |
| W | 0.05 |

The overhead solid product analysed:

| | Wt. percent |
|---|---|
| Cl⁻ | 62.0 |
| Nb | 25.5 |
| Ta | 9.8 |
| W | 3.0 |
| Al | 0.005 |
| Fe | 0.002 |

From the weights of the various products it is found that 0.2% of the niobium and 0.7% of the tantalum in the feed is lost into the bottom stream from the salt column.

*Example III*

Using the equipment of Example II, about 62 grams of anhydrous mixed metal chloride vapors were fed to the salt column containing 100 grams of solid NaCl. The temperature of the salt bed was maintained at 444±20° C. The bottom receiver was maintained at 448° C. A purge of inert gas entered below the salt bed.

The condensed chloride feed was analysed:

| | Wt. percent |
|---|---|
| Cl⁻ | 63.0 |
| Nb | 17.8 |
| Ta | 6.8 |
| Fe | 8.40 |
| W | 1.9 |
| Al | 1.1 |

The tungsten was largely in the form of $WOCl_4$.
The bottom remains analysed:

| | Wt. percent |
|---|---|
| Cl⁻ | 64.0 |
| FE | 19.8 |
| Na | 9.0 |
| Al | 3.0 |
| Ta | 0.002 |
| Nb | 0.002 |
| W | 0.01 |

The overhead solid product analysed:

| | Wt. percent |
|---|---|
| Cl⁻ | 61.0 |
| Nb | 26.0 |
| Ta | 9.5 |
| W | 3.08 |
| Al | 0.005 |
| Fe | 0.002 |

From the weights of the various products it is found that less than 0.05% of the niobium and less than 0.1% of the tantalum in the feed is lost in the bottom stream from the salt column.

*Example IV*

About 86.6 grams of anhydrous solid mixed metal chlorides were vaporized into a stream of chlorine which was fed to a salt column containing 100 grams of solid NaCl. The apparatus differed from that used in Example I only in that during the run the inert gas flow into the bottom receiver was shut off. Chlorine was introduced with the feed vapors. The temperature of the salt bed was held at 256±10° C. and that of the bottom receiver was held at 251±5° C. The chlorine acted as a carrier gas through the control of which the partial pressure of $NbCl_5$ could be varied. It also served to repress possible $FeCl_3$ decomposition in the feed tube. The salt bed consisted of screened kiln-dried NaCl analysing 99.7% NaCl. The sieve analysis was as follows:

| | |
|---|---|
| 20 mesh | None passing. |
| 8 mesh | 20% passing. |
| 6 mesh | 61% passing. |
| 4 mesh | 100% passing. |

The condensed chloride feed analysed:

| | Wt. percent |
|---|---|
| Cl⁻ | 65.4 |
| Nb | 20.6 |
| Fe | 14.0 |

The bottom stream analysed:

| | Wt. percent |
|---|---|
| Cl⁻ | 64 |
| Nb | 2.06 |
| Fe | 24.4 |
| Na | 9.6±1 |

The overhead solid product analysed:

| | Wt. percent |
|---|---|
| Cl⁻ | 64 |
| Nb | 34.9 |
| Fe | .005 |

From the weights of the various products it is found that 5.2% of the niobium is lost into the bottom stream of the salt column. The partial pressure of $NbCl_5$ was 0.1 atmosphere in the feed stream.

*Example V*

About 60.5 grams of solid anhydrous mixed metal chlorides were vaporized into a stream of chlorine which was fed to a salt column containing 100 grams of solid NaCl (NaCl as in Example IV). The temperature of the salt bed was held at 254±10° C. and the bottom receiver held at 253±10° C. The apparatus was set up as in Example IV and chlorine entered with the feed vapors.

The condensed chlorine feed analysed:

| | Wt. percent |
|---|---|
| Cl⁻ | 65 |
| Nb | 14.7 |
| Fe | 19.7 |

The bottom stream analysed:

| | Wt. percent |
|---|---|
| Cl⁻ | 64 |
| Nb | 1.64 |
| Fe | 24.0 |
| Na | 9.7±1 |

The top product analysed:

| | Wt. percent |
|---|---|
| Cl⁻ | 62 |
| Nb | 35.9 |
| Fe | 0.003 |

From the weights of the various products it is found that 7.7% of the niobium is lost into the bottom stream of the salt column. The partial pressure of $NbCl_5$ was 0.05 atmosphere in the feed stream.

*Example VI*

About 100.3 grams of solid anhydrous mixed metal chlorides were vaporized into a stream of chlorine which was fed to a salt column containing 100 grams of solid NaCl (NaCl as in Example IV). The temperature of the salt bed was held at 297±10° C. and the bottom receiver at 298±10° C. The apparatus was operated as in Example V.

The condensed chloride feed analysed:

| | Wt. percent |
|---|---|
| Cl⁻ | 55.5 |
| Ta | 32.5 |
| Fe | 12.0 |

The bottom stream analysed:

| | Wt. percent |
|---|---|
| Cl⁻ | 62 |
| Ta | 4.92 |
| Fe | 23.0 |
| Na | 9.2±1 |

The overhead solid product analysed:

| | Wt. percent |
|---|---|
| Cl⁻ | 48.9 |
| Ta | 50.7 |
| Fe | .001 |

From the weights of the various products it is found that 7.5% of the tantalum is lost into the bottom stream of the salt column. The partial pressure of the $TaCl_5$ was 0.1 atm. in the feed stream.

*Example VII*

About 65.2 grams of anhydrous solid mixed metal chlorides were vaporized into a stream of chlorine which was fed to a salt column containing 100 grams of solid NaCl (NaCl as in Example IV). The tempearture of the salt bed was held at 295±10° C. and the bottom receiver at 294±5° C. The apparatus was operated as in Example V.

The condensed chloride feed analysed:

| | Wt. percent |
|---|---|
| Cl⁻ | 57.8 |
| Ta | 23.9 |
| Fe | 18.0 |

The bottom stream analysed:

| | Wt. percent |
|---|---|
| Cl⁻ | 63 |
| Ta | 2.99 |
| Fe | 23.6 |
| Na | 9.5±1 |

The overhead solid product analysed:

| | Wt. percent |
|---|---|
| Ta | 50.8 |
| Fe | 0.001 |

From the weights of the various products it is found that 8.6% of the tantalum is lost into the bottom stream of the salt column. The partial pressure of the $TaCl_5$ was 0.05 atmosphere in the feed stream.

*Example VIII*

In this example, the apparatus used was that illustrated in FIGURE 2.

About 299.4 grams of anhydrous solid metal chlorides were vaporized into a stream of chlorine which was fed to the salt column containing 130 grams of solid NaCl (NaCl as in Example IV). The temperature of the salt bed 25 was held at 295±20° C. The temperature of the stripper-absorber 33 was held at 295±15° C. The temperature of the bottom receiver 37 was held at 293±10° C.

The condensed chloride feed analysed:

| | Wt. percent |
|---|---|
| Cl⁻ | 54.1 |
| Ta | 33.3 |
| Fe | 11.7 |

The bottom stream analysed:

| | Wt. percent |
|---|---|
| Cl⁻ | 64 |
| Ta | 1.6 |
| Fe | 27.6 |
| Na | 6.6±1 |

The overhead solid product analysed:

| | Wt. percent |
|---|---|
| Ta | 50.8 |
| Fe | 0.002 |

From the weights of the various products it is found that 2% of the tantalum is lost into the bottom stream of the salt column. The partial pressure of $TaCl_5$ was 0.1 atmosphere in the feed stream.

*Example IX*

Using the apparatus of Example VIII, 300.5 grams of anhydrous solid mixed metal chlorides was vaporized into a stream of chlorine which was fed to a solid NaCl. The NaCl used was as in Example IV. The temperature of the salt bed was held at 350±15° C. The temperature of the stripper-absorber was held at 350±10° C. The temperature of the bottom receiver was held at 350±10° C.

The condensed chloride feed analysed:

| | Wt. percent |
|---|---|
| Cl⁻ | 54.7 |
| Ta | 32.9 |
| Fe | 11.9 |

The bottom stream analysed:

| | Wt. percent |
|---|---|
| Cl⁻ | 64.3 |
| Ta | 0.71 |
| Fe | 26.8 |
| Na | 8.2±1 |

The overhead solid product analysed:

| | Wt. percent |
|---|---|
| Ta | 50.8 |
| Fe | .001 |

From the weights of the various products it is found that 0.97% of the tantalum is lost into the bottom stream of the salt column. The partial pressure of $TaCl_5$ was 0.1 atmosphere in the feed stream.

*Example X*

Using the apparatus of Example VIII, 349.7 grams of anhydrous solid mixed metal chlorides were vaporized into a stream of chlorine which was fed to a salt column containing 130 grams of solid NaCl. The NaCl used was as in Example IV. The temperature of the salt bed was held at 325±10° C. The temperature of the stripper-absorber was held at 325±5° C. The temperature of the bottom receiver was 324±5° C.

The condensed chloride feed analysed:

| | Wt. percent |
|---|---|
| Fe | 9.9 |
| Ta | 7.15 |
| Nb | 18.8 |
| Al | .26 |
| W | .04 |
| Mn | .51 |

The bottom stream analysed:

| | Wt. percent |
|---|---|
| Ta | 0.15 |
| Nb | 0.29 |
| Al | 0.7 |
| Fe | 25.4 |
| Na | 7.4±1 |
| Mn | 1.31 |

The overhead solid product analysed:

| | Wt. percent |
|---|---|
| Ta | 10.4 |
| Nb | 27.4 |
| Fe | 0.001 |
| W | 0.058 |

From the weights of the various products it is found that 0.8% of the Ta and 0.6% of the Nb are lost into the bottom stream of the salt column. The partial pressures of $TaCl_5$ and $NbCl_5$ were .05 and 0.26 atmosphere respectively in the feed stream.

*Example XI*

About 69 grams of anhydrous solid mixed metal chlorides were vaporized into a chlorine stream which was fed to a salt column containing 100 grams of solid NaCl. The NaCl used was as in Example IV. The temperature of the salt bed was held at 350±10° C. and the bottom receiver held at 343±10° C. The apparatus used was as in Example IV.

The condensed chloride feed analysed:

| | Wt. percent |
|---|---|
| Al | 8.53 |
| Ta | 14.6 |
| Nb | 9.93 |

The bottom stream analysed:

| | Wt. percent |
|---|---|
| Cl⁻ | 74.3 |
| Al | 14.4 |
| Ta | 0.33 |
| Nb | 0.08 |
| Na | 11.3±1 |

The overhead solid product analysed:

| | Wt. percent |
|---|---|
| Al | .001 |
| Ta | 24.2 |
| Nb | 18.3 |

From the weights of the various products it is found that 1.3% of the Ta and 0.5% of the Nb is lost into the bottom stream. The partial pressure of $TaCl_5$ and $NbCl_5$ were 0.03 and 0.04 atmosphere respectively in the feed stream.

*Example XII*

About 87.5 grams of anhydrous solid mixed metal chlorides were vaporized into a stream of chlorine which was fed to a salt column containing 110 grams of solid KCl. The KCl used in this example was Baker reagent grade. It was melted at 850° C., cooled in a desiccator and ground to +10–4 mesh in a dry gas atmosphere. The temperature of the salt bed was held at 450±10° C. and the bottoms receiver at 447±10° C. The apparatus used was as in Example IV.

The condensed chloride feed analysed:

| | Wt. percent |
|---|---|
| Nb | 20.6 |
| Fe | 13.85 |
| Cl⁻ | 65.6 |

The bottom stream analysed:

| | Wt. percent |
|---|---|
| Nb | 9.35 |
| Fe | 12.35 |
| Cl⁻ | 58.9 |
| K | 19.4±2 |

The overhead solid product analysed:

| | Wt. percent |
|---|---|
| Nb | 34.8 |
| Fe | 0.005 |

From the weights of the various products it is found that 50% of the Nb is lost in the bottoms. The partial pressure of $NbCl_5$ was 0.1 atmosphere in the feed stream.

This example illustrates the sharply selective nature of sodium chloride as contrasted with the closely related potassium chloride.

*Example XIII*

About 105.7 grams of anhydrous solid mixed metal chlorides were vaporized into a stream of chlorine which was fed to a salt column containing 100 grams of solid NaCl. See Example IV for NaCl information. The temperature of the salt bed was held at 325±15° C. and the bottom receiver at 328±5° C. The apparatus used was as in Example IV.

The condensed chloride feed analysed:

| | Wt. percent |
|---|---|
| W | 32.2 |
| Fe | 11.4 |

Approximately 22% of the W is in the form $WOCl_4$. The remainder is in the form $WCl_6$.

The bottom stream analysed:

| | Wt. percent |
|---|---|
| W | 0.49 |
| Fe | 25.3 |
| Na | 10±1 |

The overhead solid product analysed:

| | Wt. percent |
|---|---|
| W | 47.2 |
| Fe | .008 |

From the weights of the various products it is found that 0.67% of the W was lost in the bottom stream. The partial pressures of $WCl_6$ and $WOCl_4$ were about 0.09 and 0.023 atm. respectively in the feed stream.

*Example XIV*

About 289.2 grams of anhydrous solid mixed metal chlorides were vaporized into a stream of chlorine which was fed to the apparatus used in Example VIII. The 130 grams of solid NaCl used in this experiment were larger than in previous examples. The sieve analysis was as follows:

| | Percent passing |
|---|---|
| 6 mesh | 2.0 |
| 4 mesh | 10.0 |
| 3 mesh | 81.0 |
| ⅜" mesh | 99.9 |
| ½" mesh | 100.0 |

The upper half of the salt bed was held at 305±5° C. The lower portion of the bed was held at 280±10° C. (bulk of reaction occurs in this region). The stripper-absorber was held at 345±5° C. The bottom receiver was at 340±5° C.

The condensed chloride feed analysed:

| | Wt. percent |
|---|---|
| Nb | 17.1 |
| Ta | 6.9 |
| Fe | 9.5 |
| W | 2.1 |
| Al | 1.0 |

The bottom stream analysed:

| | Wt. percent |
|---|---|
| Nb | 0.21 |
| Ta | 0.10 |
| Fe | 23.5 |
| W | .02 |
| Al | 2.5 |
| Na | 7.7±1 |

The solid overhead product analysed:

| | Wt. percent |
|---|---|
| Nb | 25.2 |
| Ta | 10.4 |
| Fe | .002 |
| W | 3.0 |
| Al | .005 |

From the weights of the products it is found that 0.5% of the niobium, 0.6% of the tantalum, and less than 0.4% of the tungsten is lost into the bottom stream. The partial pressure of $NbCl_5$ was 0.2 atmosphere and $TaCl_5$ 0.045 atmosphere and tungsten chlorides plus oxychlorides 0.013 atmosphere.

We claim:

1. A continuous process for purifying a mixture of metal chlorides by removing a contaminating metal chloride selected from the class consisting of iron chloride and aluminum chloride from at least one other metal chloride selected from the class consisting of niobium chloride, tantalum chloride, tungsten chloride and tungsten oxychloride comprising:

(a) vaporizing said metal chloride mixture;
(b) passing the said vaporized mixture into one end of a column of solid sodium chloride maintained at a temperature of between 250° C. and 450° C.;
(c) maintaining solid sodium chloride in the said column throughout the process by adding solid sodium chloride thereto;
(d) passing said vaporized mixture through said column whereby to form a complex of said contaminating metal chloride and said sodium chloride; and
(e) withdrawing a vapor stream of said other metal chloride from the other end of said column after passage of said vaporized mixture through said column.

2. A continuous process for purifying a mixture of metal chlorides by removing a contaminating metal chloride selected from the class consisting of iron chloride and aluminum chloride from at least one other metal chloride selected from the class consisting of niobium chloride, tantalum chloride, tungsten chloride and tungsten oxychloride comprising:

(a) vaporizing said metal chloride mixture;
(b) passing said vaporizing mixture into contact with solid sodium chloride maintained at a temperature of between about 250° C. and 450° C. to form a melt containing sodium chloride, said contaminating metal chloride and said other metal chloride and a vapor stream of mixed metal chlorides containing said other metal chloride and a lesser quantity of said contaminating metal chloride than the said initial mixture;

(c) maintaining solid sodium chloride in the said column throughout the process by adding solid sodium chloride thereto;

(d) passing said melt countercurrent to the incoming stream of vaporized metal chlorides formed in (a) before contact of the said vaporized metal chlorides with the said solid sodium chloride;

(e) passing the said vapor stream of mixed metal chlorides emerging from step (d) into one end of a column of solid sodium chloride maintained at a temperature of between about 250° C. and 450° C.;

(f) passing said vaporized mixture through said column whereby to absorb additional of said contaminating metal chloride; and (g) withdrawing a vapor stream of the said other metal chloride from the other end of the said column substantially free of the said contaminating metal chloride after passage through said column.

References Cited in the file of this patent
UNITED STATES PATENTS

| | | |
|---|---|---|
| 2,533,021 | Krchma | Dec. 5, 1950 |
| 2,744,060 | Eaton | May 1, 1956 |
| 2,928,722 | Scheller | Mar. 15, 1960 |